United States Patent Office 3,209,001
Patented Sept. 28, 1965

3,209,001
MORPHOLINOTHIO TERT-BUTYL PHENOL COMPOUNDS
Ernest Csendes, Atlanta, Ga., assignor to E. I. du Pont de Nemours and Company, Wilmington, Del., a corporation of Delaware
No Drawing. Filed Jan. 22, 1962, Ser. No. 167,944
6 Claims. (Cl. 260—247.1)

This invention relates to new alkylated phenol compounds and to a process for their preparation. This invention also relates to elastomers containing the new compounds which act therein as improved antioxidants.

A great many alkylated phenols are known to have antioxidant activity in natural rubber and other elastomers. However, the effectiveness of phenolic compounds of this type varies greatly and is unpredictable. There is a need in the industry for additional compounds which are effective in protecting elastomers against deterioration during prolonged exposure to high temperatures. The term, elastomers, is intended to include both natural rubber and synthetic rubber.

It is an object of this invention to provide new alkylated phenol compounds which exhibit prolonged antioxidant activity in elastomers at elevated temperatures. It is a further object to provide new morpholinothio-tert-butyl phenols and a process for their preparation. It is a still further object to provide new and improved antioxidants for elastomers, particularly for natural rubber, and to further provide elastomer compositions and cured elastomers containing the new compounds of this invention as antioxidants. Other objects will appear hereinafter.

These and other objects are accomplished by new morpholinothio-tert-butyl phenol compounds of the formula

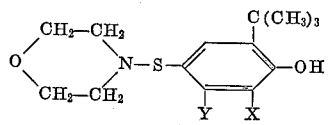

in which X is tert-butyl and Y is H; or X is H and Y is methyl. These new compounds are 2,6-di-tert-butyl-4-(morpholinothio)phenol and 6-tert-butyl-4-(morpholinothio)-m-cresol, respectively. The new compounds are prepared by reacting morpholinosulfenyl chloride with the appropriate phenol. The product therefrom when incorporated in a minor proportion in the elastomer compositions hereinafter provided is an effective antioxidant at elevated temperatures.

The compounds of this invention may be prepared by reacting morpholinosulfenyl chloride with 2,6-di-tert-butylphenol or 6-tert-butyl-m-cresol. The reaction is preferably carried out in an inert organic solvent, such as carbon tetrachloride, under reflux conditions. Representative examples of other solvents that would be suitable are chlorotrifluoromethane, tetrachloroethylene, trichloroethylene, and 1,1,1-trichloroethane. On cooling, the product precipitates from the solvent and can be filtered off. If desired, it can be further purified by conventional methods, such as recrystallization.

The starting materials for these syntheses are known materials. Morpholinosulfenyl chloride can be prepared by reacting chlorine with 4,4'-dithiodimorpholine as described by A. Dorlars in Houben-Weyl, "Methoden der Organischen Chemie," 4th ed., volume 11, part 2, page 745, and German Patent 965,968. The morpholinosulfenyl chloride can be used without isolation from the reaction medium for the condensation with the phenolic compound.

The compounds of this invention are effective antioxidants for protecting elastomeric materials against oxidative deterioration during aging. The compounds are suitable for use in natural rubber and in synthetic rubber, particularly that which is prepared from conjugated hydrocarbon dienes, such as butadiene-styrene copolymers, cis-polybutadiene, and cis-polyisoprene. Because of their relatively low volatility, these compounds are exceptionally persistent in elastomers which are subjected to high temperatures.

The antioxidant can be added to the dry polymer in known ways, such as by blending on a roll mill or in a Banbury mixer, or an aqueous dispersion of the antioxidant may be added to the polymer latex.

Amounts from about 0.1 to 5 parts, by weight per 100 parts of elastomer can be used, depending on the degree of protection desired, the type of elastomer, and the conditions of use. Less than about 0.1 part does not give adequate protection and more than 5 parts is not needed and is wasteful of material. The effect of the phenolic antioxidants can be enhanced by the addition of other materials such as N-alkylglucamines, 1-thiosorbitol, and sorbitol, as disclosed, respectively, in U.S. 2,970,128, U.S. 2,999,842, and U.S. 2,999,841.

The compounds of this invention may in general be used with any of the usual elastomer compounding ingredients, such as vulcanizing agents, plasticizers, pigments, fillers, extenders, and reinforcing agents.

Representative examples illustrating the present invention are as follows. Parts are by weight unless otherwise indicated.

EXAMPLE A.—PREPARATION OF MORPHOLINOSULFENYL CHLORIDE 354 grams of 4,4'-dithiodimorpholine are suspended in 1200 ml. of carbon tetrachloride and are cooled to 0° C. 116 grams of chlorine gas are passed into the solution while maintaining the temperature at 0–6° C. Excess chlorine is blown out with air, and the clear yellow solution containing the morpholinosulfenyl chloride produced is used for the preparation of the compounds of the following examples.

EXAMPLE 1

231 milliliters of the solution containing morpholinosulfenyl chloride, prepared as described in Example A, are added to a solution of 61.5 grams of 6-tert-butyl-m-cresol in 150 ml. of carbon tetrachloride and refluxed for 30 minutes. The solution is cooled, and the crystals which precipitate are filtered off. After recrystallization from acetone, 35.4 grams of 6-tert-butyl-4-(morpholinothio)-m-cresol are isolated in the first fraction, having a melting point of 142–145° C. (6-tert-butyl-m-cresol is a liquid at room temperature). Analysis shows a sulfur content of 14.0 percent (calculated, 12.0 percent). The infrared spectrum shows OH bands at 2.80 (w.), 2.92 (w.) and 3.02 (s.)µ, and tert-butyl bands at 7.16, 7.30 (s.)µ. The ether function of the morpholine shows up as a band at 9.05 (s., br.)µ, which band is absent in the phenolic starting material.

EXAMPLE 2

231 milliliters of the solution containing morpholinosulfenyl chloride, prepared as described in Example A, are added to a solution of 78.0 grams of 2,6-di-tertiary-butylphenol in 150 ml. of carbon tetrachloride and refluxed for 30 minutes. The solution is cooled, and the precipitated crystals are filtered off. After recrystallization from acetone, 10 grams of 2,6-di-tert-butyl-4-(morpholinothio)phenol having a melting point of 206° C. are obtained. (The parent phenol melts at 35–37° C.)

Analysis shows a sulfur content of 9.1 percent (calculated, 9.9 percent). The infrared spectrum shows an OH band at 2.82 (s.)μ and tert-butyl bands at 7.15, 7.35 (s.)μ.

EXAMPLE 3

A black stock is prepared using the following recipe:

| | Parts by weight |
|---|---|
| Natural rubber smoked sheets | 100.0 |
| Easy-processing channel black | 40.0 |
| Stearic acid | 3.0 |
| Zinc oxide | 5.0 |
| Sulfur | 2.8 |
| 2-mercaptobenzothiazole | 1.0 |
| Antioxidant | 1.0 |

The compounded stock is press cured in preheated molds for 45 minutes at 144° C. Test pieces 25–30 mils in thickness are subjected to accelerated aging at 121° C. for 24 hours as described in ASTM D 865–54T. Tensile properties are measured before and after aging at 25° C. using an Instron tensile tester and pulling at a speed of 20 inches per minute. Table I shows the results compared with those obtained from a sample containing no antioxidant.

*Table I*

| | No Antioxidant | 6-Tert-butyl-4-(morpholinothio)-m-cresol Antioxidant |
|---|---|---|
| Before Aging: | | |
| Tensile Strength at Break, p.s.i. | 4,490 | 4,875 |
| Elongation at Break, percent | 515 | 570 |
| After Aging: | | |
| Tensile Strength at Break, p.s.i. | 515 | 1,200 |
| Elongation at Break, percent | 110 | 160 |
| Tensile Strength Retained, percent | 11 | 25 |

Similar results are obtained when 2,6-di-tert-butyl-4-(morpholinothio)phenol is used as the antioxidant.

It is contemplated that the elastomer composition of Example 3 is merely illustrative of stock in which the new compounds of this invention can be beneficially added as an antioxidant. Variation in elastomer batch ingredients or deletion of some and replacement by others or addition of other ingredients, within reason, when done in conjunction with the new compounds being used as antioxidants is considered within the scope of this invention.

As many widely different embodiments of this invention may be made without departing from the spirit and scope thereof, it is to be understood that this invention is not limited to the specific embodiments thereof except as defined in the appended claims.

What is claimed is:

1. A morpholinothio-tert-butyl phenol of the formula

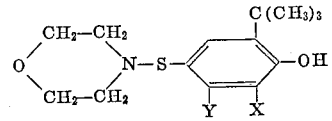

wherein X is a member selected from the group consisting of hydrogen and tert-butyl and Y is a member selected from the group consisting of methyl and hydrogen with the proviso that when X is tert-butyl, Y is hydrogen and when X is hydrogen, Y is methyl.

2. 2,6-di-tert-butyl-4-(morpholinothio)phenol.
3. 6-tert-butyl-4-(morpholinothio)-m-cresol.
4. A process which comprises contacting and reacting morpholinosulfenyl chloride with a phenol selected from the group consisting of 2,6-di-tert-butylphenol and 6-tert-butyl-m-cresol and obtaining as a result thereof a morpholinothio-tert-butyl phenol of the formula

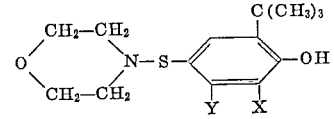

wherein X is a member selected from the group consisting of hydrogen and tert-butyl and Y is a member selected from the group consisting of methyl and hydrogen with the proviso that when X is tert-butyl, Y is hydrogen and when X is hydrogen, Y is methyl.

5. A process which comprises contacting and reacting morpholinosulfenyl chloride with 2,6-di-tert-butylphenol and obtaining as a result thereof 2,6-di-tert-butyl-4-(morpholinothio)phenol.

6. A process which comprises contacting and reacting morpholinosulfenyl chloride with 6-tert-butyl-m-cresol and obtaining as a result thereof 6-tert-butyl-4-(morpholinothio)-m-cresol.

References Cited by the Examiner

UNITED STATES PATENTS

| Re. 19,286 | 8/34 | Zaucker et al. | 260—293.4 |
|---|---|---|---|
| 1,915,334 | 6/33 | Salzberg et al. | 260—243 |
| 2,045,888 | 6/36 | Tschunkur et al. | 260—247.1 |
| 2,075,359 | 3/37 | Salzberg et al. | 167—22 |
| 2,358,925 | 9/44 | Haller et al. | 260—247.1 |
| 2,520,400 | 8/50 | Himel et al. | 260—293.4 |
| 2,816,945 | 12/57 | Beaver et al. | 260—800 |
| 2,868,633 | 1/59 | Goodhue | 260—293.4 |
| 2,911,405 | 11/59 | Gregg | 260—247.1 |
| 2,998,468 | 8/61 | Wilde et al. | 260—800 |
| 3,047,546 | 7/62 | Lober et al. | 260—293.4 |

NICHOLAS S. RIZZO, *Primary Examiner.*

LEON J. BERCOVITZ, JOHN D. RANDOLPH,
*Examiners.*